(12) United States Patent
Seo et al.

(10) Patent No.: US 10,293,533 B2
(45) Date of Patent: May 21, 2019

(54) METHOD OF MANUFACTURING DOORSTEP OR DOOR SCUFF

(71) Applicant: Hyundai Motor Company, Seoul (KR)

(72) Inventors: Jae Sik Seo, Suwon-si (KR); Choon Soo Lee, Seoul (KR); Woo Chul Jung, Bucheon-si (KR); Do Hyoung Kim, Ansan-si (KR)

(73) Assignee: Hyundai Motor Company, Seoul (KR)

( * ) Notice: Subject to any disclaimer, the term of this patent is extended or adjusted under 35 U.S.C. 154(b) by 150 days.

(21) Appl. No.: 15/377,965

(22) Filed: Dec. 13, 2016

(65) Prior Publication Data

US 2018/0099440 A1 Apr. 12, 2018

(30) Foreign Application Priority Data

Oct. 12, 2016 (KR) .................. 10-2016-0131782

(51) Int. Cl.
- *B29C 45/16* (2006.01)
- *B29K 23/00* (2006.01)
- *B29K 55/02* (2006.01)
- *B29L 31/30* (2006.01)

(52) U.S. Cl.
CPC ...... *B29C 45/1671* (2013.01); *B29C 45/1657* (2013.01); *B29C 2045/166* (2013.01); *B29C 2045/1673* (2013.01); *B29K 2023/12* (2013.01); *B29K 2055/02* (2013.01); *B29L 2031/3005* (2013.01); *B29L 2031/3041* (2013.01)

(58) Field of Classification Search
None
See application file for complete search history.

(56) References Cited

U.S. PATENT DOCUMENTS 7,896,374 B2 * 3/2011 Kuntze ............... B60R 3/00
280/163

FOREIGN PATENT DOCUMENTS

| EP | 2236263 | * 10/2010 |
|---|---|---|
| JP | 2001034175 A | 2/2001 |
| JP | 2005081644 A | 3/2005 |
| JP | 2011187690 A | 9/2011 |
| KR | 20050054102 A | 6/2005 |
| KR | 100818145 B1 | 3/2008 |

* cited by examiner

*Primary Examiner* — Edmund H Lee
(74) *Attorney, Agent, or Firm* — Slater Matsil, LLP

(57) ABSTRACT

A method of manufacturing a doorstep or a door scuff is provided. The method includes an ABS material injection step of injecting an acrylonitrile butadiene styrene (ABS) material to have a doorstep (or a door scuff) shape; a plastic plating step of plating an ABS material with plastic; and a PP injection step of fixing the ABS material plated with plastic in a mold, and injecting PP to the ABS material fixed in the mold so that the ABS material and a polypropylene (PP) material have a one-piece structure.

14 Claims, 3 Drawing Sheets

METHOD OF MANUFACTURING DOORSTEP OR DOOR SCUFF

CROSS-REFERENCE TO RELATED APPLICATIONS

This application claims under 35 U.S.C. § 119(a) the benefit of Korean Patent Application No. 10-2016-0131782 filed on Oct. 12, 2016, the entire contents of which are incorporated herein by reference.

TECHNICAL FIELD

The present disclosure relates to a method of manufacturing a doorstep or a door scuff.

BACKGROUND

Particular embodiments relate to a method of manufacturing a doorstep or a door scuff, which allows a doorstep or a door scuff to have a one-piece structure by inserting a plastic plate, which is manufactured by injecting an acrylonitrile butadiene styrene (ABS) material and being plated with plastic, into a mold and then injecting a polypropylene (PP) material for a trim.

In general, a doorstep or a door scuff for a vehicle is a decoration that is mounted on a vehicle body and is not normally exposed to the outside, but when an occupant opens a vehicle door to get in the vehicle, the doorstep or the door scuff provides an aesthetic appearance for the occupant.

The doorstep or the door scuff for a vehicle, which is applied to a vehicle with a high ground clearance, such as RV vehicles, serves as a foothold that assists the occupant in getting in the vehicle.

The doorstep or the door scuff for a vehicle is manufactured by assembling a steel plate to a plastic trim, and the plate is subjected to processing such as decorative pattern etching, letter portion etching, glossy portion polishing, anti-corrosion coating, and the like, and as a result, the steel plate is selectively applied to midsize or larger vehicles, but only a plastic trim is applied to low-priced vehicles without a separate plate.

However, the doorstep or the door scuff having the plastic trim and the steel plate increases manufacturing costs because of steel processing coats, and has a level difference between the plastic trim and the steel plate, which degrades unity in respect to external appearances.

That is, in the case of the structure of the doorstep or the door scuff, as illustrated in FIG. 5, a plastic trim 1 and a steel plate 2 are separately manufactured, and an operator needs to physically fasten the plastic trim 1 and the steel plate 2. For this reason, a level difference may be present at boundaries between components in accordance with fastening quality, and design unity may deteriorate, and as a result, costs are incurred due to steel processing and assembling, and thus the doorstep or the door scuff is applied only to midsize or larger vehicles.

Korean Patent No. 10-0818145 (Mar. 25, 2008) is related to the subject matter disclosed herein.

The above information disclosed in this Background section is only for enhancement of understanding of the background of the invention and therefore it may contain information that does not necessarily form the prior art that is already known in this country to a person of ordinary skill in the art.

SUMMARY

The present invention has been made in an effort to solve the above-described problems associated with the prior art, and to provide a method of manufacturing a doorstep or a door scuff, which is capable of minimizing the occurrence of a level difference between an ABS material and a PP material for a trim, by manufacturing a doorstep or a door scuff in which the ABS material and the PP material form a one-piece structure, by injecting an acrylonitrile butadiene styrene (ABS) material to have a doorstep (or a door scuff) shape, fixing the ABS material plated with plastic in a mold, and injecting a polypropylene (PP) material into the mold.

In one aspect, the present invention provides a method of manufacturing a doorstep or a door scuff. An ABS material injection step is performed to inject an acrylonitrile butadiene styrene (ABS) material to have a doorstep (or a door scuff) shape. A plastic plating step is performed to plate an ABS material with plastic. A PP injection step is performed to fix the ABS material plated with plastic in a mold, and to inject PP to the ABS material fixed in the mold so that the ABS material and a polypropylene (PP) material have a one-piece structure.

In a preferred embodiment, the ABS material injection step may comprise forming through holes in a surface of the ABS material which corresponds to a position where the PP material is injected.

In another preferred embodiment, the ABS material injection step may comprise forcedly corroding, with HCl, an outer circumferential surface of an area where the through holes are formed.

In still another preferred embodiment, the ABS material injection step may comprise forming an unevenness structure on inner surfaces of the through holes by the HCl corrosion of the area where the through holes are formed.

In yet another preferred embodiment, the PP injection step may comprise injecting the PP into the mold so that the PP is introduced into the through holes.

In still yet another preferred embodiment, the PP injection step may comprise fixing the ABS material in the mold by means of a plurality of fixing guide pins formed on the ABS material when the ABS material is injected.

In a further preferred embodiment, the plastic plating step may comprise plating the ABS material with plastic so that copper, nickel, and chromium are sequentially created on a surface of the ABS material.

According to the present invention, a doorstep or a door scuff is manufactured such that the ABS material and the PP material have a one-piece structure by injecting the ABS material to have a doorstep (or a door scuff) shape, fixing the ABS material plated with plastic in the mold, and injecting the PP into the mold, and as a result, it is possible to minimize the occurrence of a level difference between the ABS material and the PP material for a trim.

According to the present invention, the ABS material is plated with plastic, and may be substituted for the steel doorstep (or door scuff) plate applied in the related art, and as a result, it is possible to reduce costs and a weight.

Other aspects and preferred embodiments of the invention are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuel derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinbelow by way of illustration only, and thus are not limitative of the present invention, and wherein.

Figure 1:
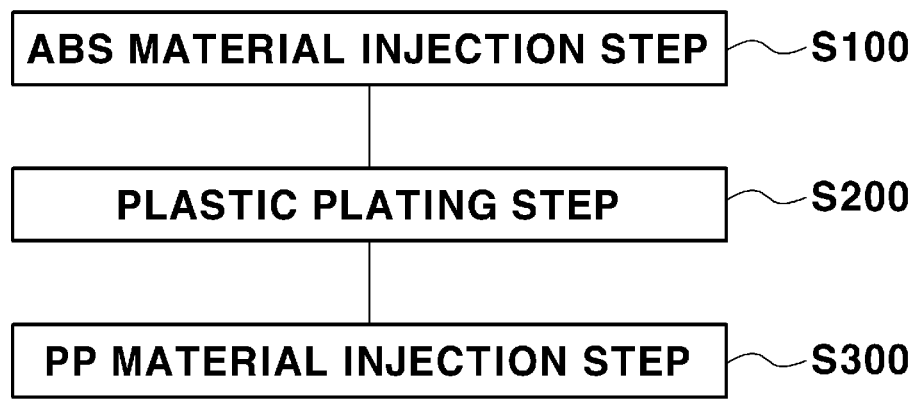
FIG. 1 is a view sequentially illustrating a method of manufacturing a doorstep or a door scuff according to an exemplary embodiment of the present invention.

Reference numerals set forth in the Drawings include reference to the following elements as further discussed below:

10: ABS material
12: fixing guide pin
20: PP material
30: mold
H: through hole

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF ILLUSTRATIVE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Advantages and features of the present invention and methods of achieving the advantages and features will be clear with reference to the exemplary embodiments described in detail below together with the accompanying drawings.

However, the present invention is not limited to the exemplary embodiments set forth below, and may be embodied in various other forms. The present exemplary embodiments are for rendering the disclosure of the present invention complete and are set forth to provide a complete understanding of the scope of the invention to a person with ordinary skill in the technical field to which the present invention pertains, and the present invention will only be defined by the scope of the claims.

In the description of the present invention, a detailed explanation of publicly known related technologies may be omitted so as to avoid unnecessarily obscuring the subject matter of the present invention.

Figure 2:
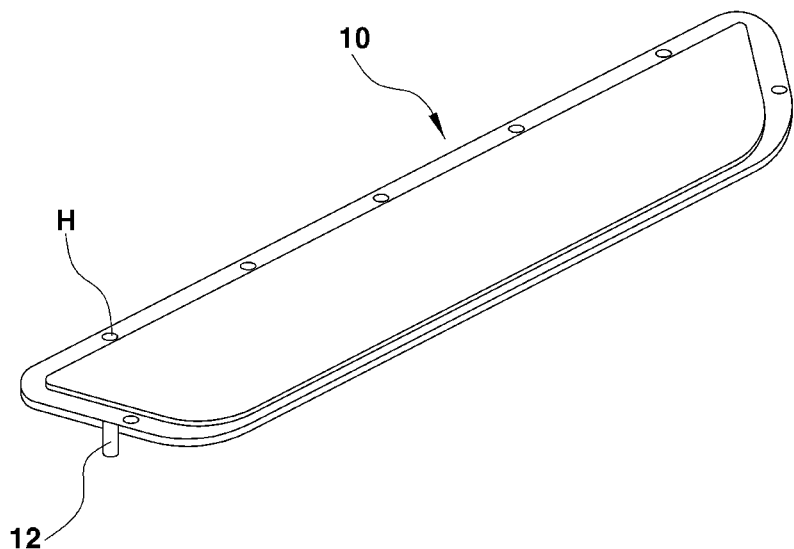
FIG. 2 is a view illustrating an ABS material injected in accordance with the method of manufacturing a doorstep or a door scuff according to the exemplary embodiment of the present invention.

FIG. 1 is a view sequentially illustrating a method of manufacturing a doorstep or a door scuff according to an exemplary embodiment of the present invention, and FIG. 2 is a view illustrating an ABS material injected in accordance with the method of manufacturing a doorstep or a door scuff according to the exemplary embodiment of the present invention.

Figure 3:
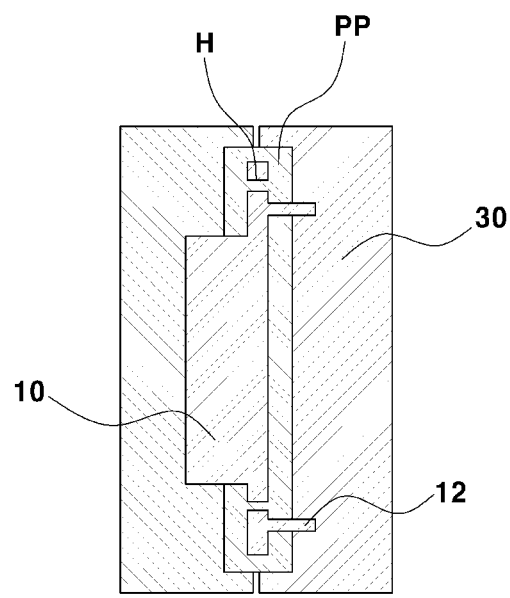
FIG. 3 is a view illustrating injection of a PP material in accordance with the method of manufacturing a doorstep or a door scuff according to the exemplary embodiment of the present invention.
Figure 4:
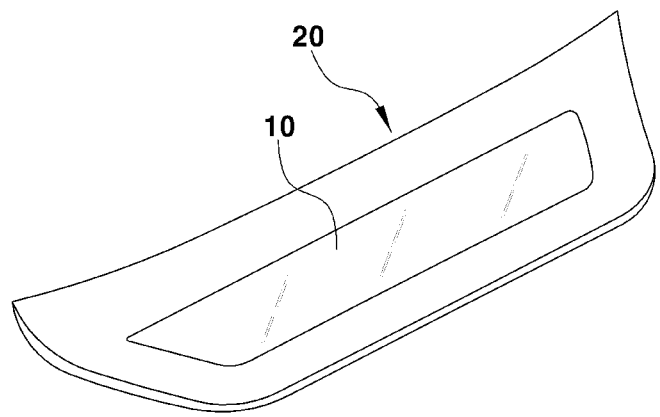
FIG. 4 is a view illustrating a finished doorstep or a door scuff in accordance with the method of manufacturing a doorstep or a door scuff according to the exemplary embodiment of the present invention.
Figure 5:
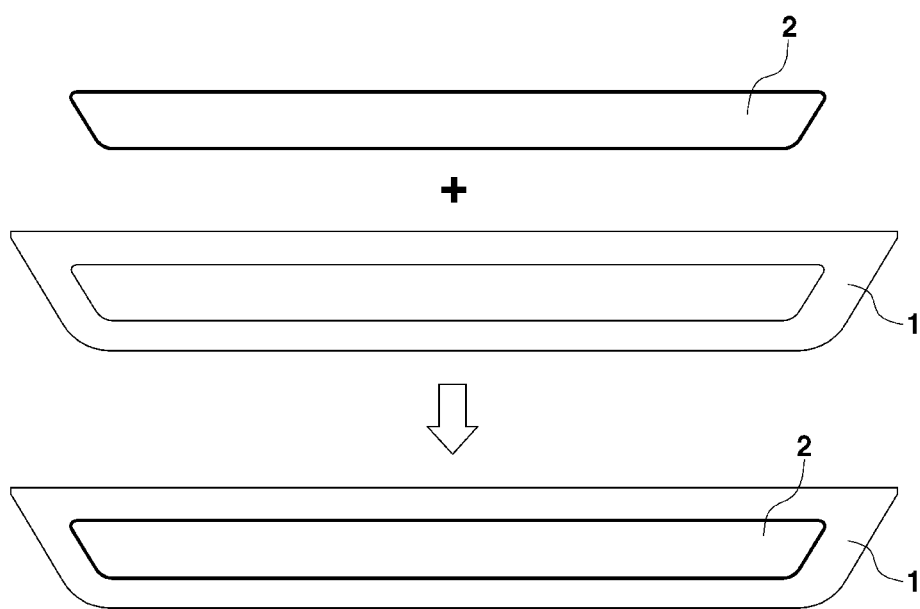
FIG. 5 is a view sequentially illustrating a method of manufacturing a doorstep or a door scuff in the related art.

FIG. 3 is a view illustrating injection of a PP material in accordance with the method of manufacturing a doorstep or a door scuff according to the exemplary embodiment of the present invention, and FIG. 4 is a view illustrating a finished doorstep or a door scuff in accordance with the method of manufacturing a doorstep or a door scuff according to the exemplary embodiment of the present invention.

A method of manufacturing a doorstep or a door scuff according to the present exemplary embodiment will be sequentially described with reference to FIG. 1.

First, an acrylonitrile butadiene styrene (ABS) material 10 is injected to have a doorstep (or a door scuff) shape (S100).

That is, when the ABS material 10 is injected to have a doorstep (or a door scuff) shape through the primary injection, the ABS material 10 is injected so that a plurality of through holes H is formed within a region corresponding to a rim region of the ABS material 10, that is, a position where a polypropylene (PP) material 20 is injected as illustrated in FIG. 2.

The through holes H are formed for the engagement of the ABS material 10 and the PP material 20 to be described below. When the ABS material 10 having polarity is plated with plastic (S200), copper, nickel, and chromium are sequentially created on the surface, and because there is no chemical bond between the PP, which is a non-polar polymer that is secondarily injected later by using a mold 30, and the chromium at an uppermost end of the ABS material 10 plated with plastic, the ABS material and the PP material are not bonded together.

Here, the copper, which is sequentially formed as described above when the ABS material 10 is plated with plastic (S200), serves to prevent contraction or expansion of the ABS material 10 which occurs during the injection process, and the nickel serves to prevent corrosion of the ABS material 10, and the chromium serves to prevent scratch such that the appearance of the ABS material 10 is formed.

Consequently, in the present exemplary embodiment, when the ABS material 10 is injected through the primary injection, the through holes H are formed in the ABS material 10, and the PP is hardened in a state in which the PP is introduced into the through holes H through the secondary injection to be performed later, and as a result, it is possible to allow the ABS material 10 and the PP material 20, which are not chemically bonded together as described above, to be coupled to each other.

Meanwhile, during the primary injection, an outer circumferential surface of an area of a primary mold (not illustrated) where the through holes H are formed when injecting the ABS material 10, may be corroded by HCl.

This is to increase a physical specific surface area between the through holes H and the PP material introduced therein. If an unevenness structure is formed on an inner surface of the through hole H at the time of the primary injection through the area forcedly corroded as described above, the PP may be effectively fixed by the unevenness structure in a state in which the PP is introduced into the through holes H, at the time of the secondary injection, and as a result, the ABS material 10 and the PP material may be securely coupled.

TABLE 1

| Corrosion Time (min) | Surface Roughness (Ra, μm) | | | Adhesive Force (MPa) |
| --- | --- | --- | --- | --- |
| | After Corrosion of Mold | After ABS Injection | After Plating | |
| 0 | 0.45 | 0.03 | 0.02 | Evaluation is Impossible (Detachment) |
| 20 | 1.07 | 0.99 | 0.2 | 0.81 |
| 40 | 1.28 | 1.22 | 0.68 | 1.36 |
| 60 | 1.66 | 1.63 | 1.03 | 2.42 |
| 80 | 1.84 | 1.79 | 1.46 | 3.17 |
| 100 | 1.45 | 1.40 | 0.97 | 1.43 |

Here, the corrosion time required for the area where the through holes H are formed may be set to about 60 to 80 minutes as shown in the experimental data in Table 1.

If the corrosion time is set to about 20 to 40 minutes, surface roughness at the area where the through holes H are formed is low, and surface roughness of the inner surface of the through hole H is also low after the plastic plating. If the corrosion time is set to longer than 80 minutes, excessive corrosion occurs at the area where the through holes H are formed, and the surface is smoothened, such that the coupling of PP is difficult to be performed later, and as a result, the corrosion time may be set to about 60 to 80 minutes.

TABLE 2

| Diameter of Through Hole (mm) | PP Formability |
| --- | --- |
| 0 | — |
| 0.5 | NO Formation |
| 1.0 | NO Formation |
| 1.5 | OK |
| 2 | OK |
| 2.5 or larger | OK |

A diameter of the through hole H formed in the ABS material 10 may be set to about 1.5 to 2 mm as shown in the experimental data in Table 2.

The reason is that if the diameter of the through hole H is set to about 0.5 to 1.0 mm, a relatively small amount of PP is introduced into the through hole H at the time of the secondary injection due to the small diameter of the through hole H, and specifically, the defect of the PP material 20 may occur because the PP is hardened before a rear shape of the PP material 20 is formed.

If the diameter of the through hole H is set to about 2.5 mm or larger, the defect of the PP material 20 does not occur, but because the diameter of the through hole H needs to be increased, a rim length of the ABS material 10 having the through holes H is increased accordingly, and as a result, there may occur a problem in that an overall length of the ABS material 10 needs to be increased.

Therefore, in the present exemplary embodiment, the corrosion time required for an area for the primary mold (not illustrated) where the through holes H are formed at the time of the primary injection is set to about 60 to 80 minutes, and in this case, the diameter of the through hole H may be about 1.5 to 2 mm.

Meanwhile, as illustrated in FIG. 3, the ABS material 10 plated with plastic is fixed to the mold 30, the PP is injected into the ABS material 10 fixed in the mold 30 so that the ABS material 10 and the PP material 20 have a one-piece structure (S300).

That is, in a state in which the ABS material 10 is fixed in the mold 30 by a plurality of fixing guide pins 12 formed on the ABS material 10 by injecting the ABS material 10 at the time of the primary injection, the PP is injected into the mold 30, introduced into the through holes H, and then hardened, and as a result, the ABS material 10 and the PP material 20 may have a one-piece structure as illustrated in FIG. 4.

Here, in a state in which the surface of the ABS material 10 is sanded by about 2000 CW or more so that the ABS material 10 has a smooth surface before the ABS material 10 plated with plastic is fixed in the mold 30 as described above, the ABS material 10 may be fixed in the mold 30 by means of the fixing guide pins 12, and the PP may be introduced.

More particularly, the surface of the ABS material 10 is sanded within a range of about 2000 to 8000 CW.

TABLE 3

| | Evaluation Result | |
| --- | --- | --- |
| Sanding Grain Size | Adhesive Strength of Plating (N/cm) | Appearance (Visual Evaluation) |
| 0 | 7.46 | Occurrence of Orange Peel (NG) |
| 1000 | 6.86 | Occurrence of Fine Orange Peel (NG) |
| 2000 | 6.67 | Excellent in Plating Appearance (OK) |
| 4000 | 6.41 | Excellent in Plating Appearance (OK) |
| 6000 | 6.06 | Excellent in Plating Appearance (OK) |
| 8000 | 5.87 | Excellent in Plating Appearance (OK) |
| 10000 | 4.9 | Excellent in Plating Appearance (OK) |
| 12000 | 4.3 | Excellent in Plating Appearance (OK) |
| 14000 | 4.19 | Excellent in Plating Appearance (OK) |

The reason is that as shown in the evaluation result in Table 3, if the surface is sanded by about 0 to 1000 CW, the adhesive strength of the PP with respect to the surface of the ABS material 10 may become excellent because of the unevenness structure at the time of the secondary injection, but the external appearance of the ABS material 10 where the PP material 20 is not formed greatly deteriorates due to the occurrence of the orange peel.

Therefore, the surface may be sanded by about 2000 CW or more, that is, about 2000 to 8000 CW where the plating adhesive strength and the plating external appearance according to visual evaluation are balanced, and if the surface is sanded by 10,000 CW or more, the plating external appearance may be good, but the plating adhesive strength may greatly deteriorate because the surface has a smooth external appearance.

Consequently, in the present exemplary embodiment, a doorstep or a door scuff is manufactured such that the ABS material 10 and the PP material 20 have a one-piece structure by injecting the ABS material 10 to have a doorstep (or a door scuff) shape, fixing the ABS material 10 plated with plastic in the mold 30, and injecting the PP into the mold 30, and as a result, it is possible to minimize the occurrence of a level difference between the ABS material 10 and the PP material 20 for a trim.

In the present exemplary embodiment, the ABS material is plated with plastic, and may be substituted for the steel doorstep (or door scuff) plate applied in the related art, and as a result, it is possible to reduce costs and a weight.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a doorstep or a door scuff, the method comprising:
   injecting an acrylonitrile butadiene styrene (ABS) material to have a doorstep or a door scuff shape;
   plating the ABS material with plastic;
   fixing the plated ABS material in a mold; and
   injecting polypropylene (PP) to the plated ABS material fixed in the mold so that the plated ABS material and the PP material have a one-piece structure.

2. The method of claim 1, wherein injecting the ABS material comprises forming through holes on a surface of the ABS material.

3. The method of claim 2, wherein injecting the ABS material comprises forcedly corroding, with HCl, an outer circumferential surface of an area where the through holes are formed.

4. The method of claim 3, wherein injecting the ABS material further comprises forming an unevenness structure on inner surfaces of the through holes by the HCl corrosion of the area where the through holes are formed.

5. The method of claim 2, wherein injecting the PP comprises injecting the PP into the mold so that the PP is introduced into the through holes.

6. The method of claim 1, wherein injecting the PP comprises fixing the ABS material in the mold using a plurality of fixing guide pins formed on the ABS material when the ABS material is injected.

7. The method of claim 1, wherein plating the ABS material comprises plating the ABS material with plastic so that copper, nickel, and chromium are sequentially created on a surface of the ABS material.

8. The method of claim 3, wherein the through holes corresponding to a position where the PP material is injected.

9. The method of claim 8, wherein injecting the ABS material further comprises forming an unevenness structure on inner surfaces of the through holes by the HCl corrosion of the area where the through holes are formed.

10. A method of manufacturing a doorstep or a door scuff, the method comprising:
    injecting an acrylonitrile butadiene styrene (ABS) material to have a doorstep or a door scuff shape, wherein through holes are formed on a surface of the ABS material;
    plating the ABS material with plastic so that copper, nickel, and chromium are sequentially created on a surface of the ABS material;
    fixing the plated ABS material in a mold; and
    injecting polypropylene (PP) to the against the plating of the plated ABS material fixed in the mold, wherein the PP is introduced into the through holes when the PP is injected.

11. The method of claim 10, wherein the plated ABS material and the PP have a one-piece structure.

12. The method of claim 11, wherein the plated ABS material and the PP are not chemically bonded together.

13. The method of claim 10, wherein injecting the ABS material comprises forcedly corroding, with HCl, an outer circumferential surface of an area where the through holes are formed.

14. The method of claim 13, wherein injecting the ABS material further comprises forming an unevenness structure on inner surfaces of the through holes by the HCl corrosion of the area where the through holes are formed.

* * * * *